United States Patent Office 3,072,654
Patented Jan. 8, 1963

3,072,654
DICHLOROISOCYANURATE PROCESS
Steve Vazopolos, University City, Mo., assignor to Monsanto Chemical Company, St. Louis, Mo., a corporation of Delaware
No Drawing. Filed Aug. 12, 1959, Ser. No. 833,132
6 Claims. (Cl. 260—248)

This invention relates to a method of making calcium di(dichloroisocyanurate) and hydrates thereof which salts are useful for oxidizing, bleaching, sterilizing, disinfecting and/or cleansing purposes. This invention also relates to novel intermediates employed in preparing said calcium salts, particularly tri-calcium diisocyanurate which is a white solid having the empirical formula $Ca_3(C_3N_3O_3)_2$.

Calcium di(dichloroisocyanurate) and hydrates thereof can be represented by the structural formula

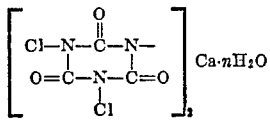

wherein $n$ is an integar in the range of from 0 to 6 inclusive. All of these salts are white crystalline substances exhibiting moderate water-solubility. Anhydrous calcium di(dichloroisocyanurate) is soluble in water to the extent of about 7 grams, 12.5 grams and 17.5 grams per 100 cc. of water at respectively 10° C., 25° C. and 40° C. Anhydrous calium di(dichloroisocyanurate) is characterized by a theoretical available chlorine content of 65.5 percent.

The process of this invention essentially comprises bringing together and reacting tri-calcium diisocyanurate and gaseous or liquid chlorine in an aqueous medium in a reaction zone while maintaining the pH in the reaction zone above about 4.5 and while maintaining the temperature in the reaction zone in the range of from about 10° C. to about 65° C., and thereafter separating the reaction product from the bulk of the aqueous phase associated therewith in the aqueous reaction mixture.

While the reaction involved in the process of this invention can be represented as $$Ca_3(C_3N_3O_3)_2 + 4Cl_2 \rightarrow Ca(Cl_2C_3N_3O_3)_2 + 2CaCl_2$$

the reaction product which is separated from the bulk of the aqueous phase of the aqueous reaction mixture is a hydrate of calcium di(dichloroisocyanurate). At reaction temperatures above about 37° C. the white crystalline solid obtained is the tetrahydrate (i.e., in the foregoing structural formula $n$ is 4) while at reaction temperatures below about 35° C. the white crystalline solid obtained is the hexahydrate (i.e., in the foregoing structural formula $n$ is 6). At reaction temperatures in the range of from about 35° C. to about 37° C. the white crystalline solid obtained is a mixture of the tetrahydrate and the hexahydrate of calcium di(dichloroisocyanurate). These hydrates upon dewatering, that is upon losing all of their water of hydration, yield anhydrous white crystalline calcium di(dichloroisocyanurate), i.e. the compound of the foregoing structural formula wherein $n$ is 0.

The tri-calcium diisocyanurate reactant of the process of this invention is a white solid which is sparingly soluble in water and whose water-solubility decreases with rise in temperature. This new compound can be prepared by a variety of methods all of which in effect employ substantially three molecular proportions of calcium hydroxide and substantially two molecular proportions of isocyanuric acid (i.e., $H_3C_3N_3O_3$, sometimes termed cyanuric acid). This new compound can be prepared at room temperature by simply mixing substantially three molecular proportions of calcium hydroxide and substantially two molecular proportions of isocyanuric acid in an aqueous medium, which reaction can be represented as (1) $3Ca(OH)_2 + 2H_3C_3N_3O_3 \rightarrow Ca_3(C_3N_3O_3)_2 + 6H_2O$ and thereafter drying the solids obtained. Tri-calcium diisocyanurate can also be prepared at room temperature by mixing substantially two molecular proportions of calcium hydroxide and substantially one molecular proportion of mono-calcium diisocyanurate in an aqeuous medium, which reaction can be represented as (2) $2Ca(OH)_2 + Ca(H_2C_3N_3O_3)_2 \rightarrow Ca_3(C_3N_3O_3)_2 + 2H_2O$ and thereafter drying the solids obtained. Mono-calcium diisocyanurate of reaction (2) above is a white solid and is ordinarily isolated as the hexahydrate (i.e., $$Ca(H_2C_3N_3O_3)_2 \cdot 6H_2O)$$

when one molecular proportion of calcium hydroxide and two molecular proportions of isocyanuric acid (sometimes termed cyanuric acid) are mixed in an aqueous medium. In that the tri-calcium diisocyanurate reactant of this invention is preferably added to the reaction zone in the form of an aqueous slurry thereof, it is not necessary to dry the solids obtained from either of the above-described reaction systems for preparing same. Ordinarily in the process of this invention the aqueous slurry of tri-calcium diisocyanurate employed will contain from 5 to 45 parts by weight of tri-calcium diisocyanurate per 100 parts by weight of water, and preferably will contain from about 15 to about 35 parts by weight of tri-calcium diisocyanurate per 100 parts by weight of water. These aqueous slurries are characterized by a pH of about 12.

The process of this invention can be carried out batchwise or in a continuous or semi-continuous manner. In a batch process the reaction vessel is charged initially with an aqueous slurry of tri-calcium diisocyanurate and while agitating the slurry chlorine, either gaseous or liquid, but preferably gaseous chlorine, is added below the surface thereof, the addition of chlorine being so controlled that the pH does not drop below 4.5. It is preferable that the addition of chlorine be stopped when a pH in the range of about 5.0 to 7.5 is reached, and in general by so maintaining the pH substantially four molecular proportions of chlorine will be consumed in the reaction system for each molecular proportion of tri-calcium diisocyanurate charge to the system. Depending upon the reaction temperatures as aforedescribed the solids which are separated from the reaction system will be either the hexahydrate of calcium di(dichloroisocyanurate) or the tetrahydrate of calcium di(dichloroisocyanurate) or mixtures thereof. These hydrates can be separated from the bulk of the aqueous phase associated therewith in the aqueous reaction mixture by any of the well known methods for separating solids from liquids, e.g., filtration, centrifugation, decantation and the like.

The preferred method of carrying out the process of this invention is in a continuous or semi-continuous manner. In such a process an aqueous slurry or tri-calcium diisocyanurate is added to a suitable reaction vessel while simultaneously adding and intimately mixing chlorine therewith, said chlorine being added as a liquid or a gas but preferably as a gas. It is necessary that the chlorine and the aqueous slurry of tri-calcium diisocyanurate be added at such a rate and with sufficient agitation to maintain the aqueous reaction medium above about 4.5 but not more than 7.5, and preferably in the range of from about 5.0 to about 7.0. The maintaining of the pH above 4.5 but not more than 7.5, and preferably in the range of 5.0 to 7.0, defines substantially stoichiometric amounts of the respective reagents, that is substantially four molecular proportions of chlorine and substantially one molecular proportion of tri-calcium diisocyanurate. Upon maintaining these pH limitations at the completion of the aqueous tri-calcium diisocyanurate addition there is consumed a substantially stoichiometric amount of chlorine (i.e., substantially four molecular proportions of chlorine for each molecular proportion of tri-calcium diisocyanurate added) in the reaction system, whereupon the addition of chlorine is stopped and the reaction system agitated slowly thereafter for a short period.

When the desired product is the hexahydrate of calcium di(dichloroisocyanurate) the reaction as aforementioned is carried out at a temperature in the range of from about 10° C. to below about 35° C., and it is particularly desirable upon completion of the reagent addition that the resulting aqueous reaction mixture be cooled to about 5° C. while slowly agitating and thereafter separate the hexahydrate solids from the bulk of the aqueous phase associated therewith in the aqueous reaction mixture. In general by so proceeding the separated aqueous phase, which will contain a very large amount of dissolved calcium chloride and a relatively small amount of dissolved calcium di(dichloroisocyanurate), can be discarded.

When the desired reaction product is the tetrahydrate of calcium di(dichloroisocyanurate) the reaction is preferably carried out at a temperature in the range of from above about 37° C. to about 65° C. and it is particularly desirable upon completion of the reagent addition that the resulting aqueous reaction mixture be cooled while slowly agitating to a temperature of not less than about 37° C. and thereafter separate the tetrahydrate solids from the bulk of the aqueous phase associated therewith in the aqueous reaction mixture. The aqueous phase so separated since it contains a substantial amount of dissolved calcium di(dichloroisocyanurate) is preferably vacuum concentrated at a temperature in the range of about 45° C. to about 65° C. in order to remove a substantial amount of the water as for example up to 33 percent thereof. By so proceeding additional amounts of the tetrahydrate of calcium di(dichloroisocyanurate) precipitate and are readily separated from the bulk of the aqueous phase associated therewith, which separated solids can be admixed with the initial separated solids and dried or dried separately. Employing such a vacuum concentrating operation the separated aqueous phase can be discarded since it contains a very large amount of calcium chloride and a relatively small amount of calcium di(dichloroisocyanurate). If desired the separated aqueous phase can be cooled to about 5° C. and the precipitated hexahydrate of calcium di(dichloroisocyanurate) collected and dried to the tetrahydrate of calcium di(dichloroisocyanurate).

In those instances wherein the desired reaction product is anhydrous or substantially anhydrous calcium di(dichloroisocyanurate) the reaction can be carried out at any temperature in the range of from about 10° C. to about 65° C. but preferably in the range of from about 20° C. to about 45° C. Upon completion of the reagent addition the aqueous reaction mixture can be either cooled to about room temperature and the hydrated calcium di(dichloroisocyanurate) separated from the bulk of the aqueous phase associated therewith in the aqueous reaction mixture or vacuum concentrated at a temperature in the range of from about 30° C. to about 60° C. to reduce the water content e.g., up to 50% by weight thereof, and thereafter separate the hydrated calcium di(dichloroisocyanurate) from the bulk of the aqueous phase associated therewith of the aqueous reaction mixture. The separated solids can then be dewatered by any of the well-known drying procedures.

It is preferred when the instant process is carried out in a continuous manner that the reaction product, i.e., calcium di(dichloroisocyanurate) tetra or hexahydrate or mixture thereof, formed in the aqueous reaction mixture in the reaction zone be continuously removed from the reaction zone together with a portion of the aqueous medium associated therewith so as to maintain the volume of the aqueous reaction mixture in the reaction zone substantially constant.

The sojourn time of an increment of tri-calcium diisocyanurate and an increment of chlorine in the reaction zone required to produce an increment of the reaction product of said reactants is less than 30 minutes and is usually less than 10 minutes.

As illustrative of the process of this invention but not limitative thereof is the following:

EXAMPLE I

To a suitable reaction vessel at about 25° C. is added and intimately mixed 28 grams (substantially 0.378 mol) of powdered calcium hydroxide, 32 grams (substantially 0.248 mol) of isocyanuric acid and 150 grams of water. During the mixing the temperature rose to 33° C. The slurry of tri-calcium diisocyanurate so prepared is then cooled to 10° C. and while agitating same chlorine gas is added below the surface thereof until the pH dropped to approximately 4.5. (The chlorine addition took about 5 minutes and during the addition the temperature rose to about 30° C.) The aqueous slurry is slowly cooled to 5° C. with slight agitation and is then filtered. The water-wet cake, actually water-wet hexahydrate of calcium di(dichloroisocyanurate), is then dried in an air-circulating oven at 105° C. The dried white crystalline product is anhydrous calcium di(dichloroisocyanurate), $Ca(Cl_2C_3N_3O_3)_2$, and is characterized by an available chlorine content of 63.5%. The yield of anhydrous calcium di(dichloroisocyanurate) based on tri-calcium diisocyanurate charged is 84% by weight. The filtrate contained substantially 100% of the by-product calcium chloride and 7.6 grams of calcium di(dichloroisocyanurate).

X-ray diffraction analysis of the hexahydrate of calcium di(dichloroisocyanurate) revealed the following principal lines (relative intensities greater than 10%).

*Table I*

| Interplanar spacing: | Relative intensity |
|---|---|
| 10.155 | 100 |
| 5.0348 | 70 |
| 3.1728 | 54 |
| 2.8030 | 27 |
| 3.0557 | 26 |
| 3.3237 | 17 |
| 3.5870 | 15 |
| 3.3482 | 15 |
| 2.5128 | 15 |
| 6.1456 | 13 |
| 3.7666 | 12 |
| 3.0054 | 10 |
| 4.5715 | 8 |

X-ray diffraction analysis of anhydrous calcium di(dichloroisocyanurate) revealed the following principal lines (relative intensities greater than 10%).

*Table II*

| Interplanar spacing: | Relative intensity |
|---|---|
| 4.2267 | 100 |
| 3.0455 | 63 |
| 4.1678 | 54 |
| 2.9664 | 34 |
| 3.9831 | 31 |
| 9.3016 | 27 |
| 3.1078 | 26 |
| 3.2522 | 24 |
| 2.4993 | 21 |
| 7.5571 | 20 |

It is particularly preferred that the reaction vessel be initially charged with an aqueous heel which can be water per se or an aqueous solution of calcium chloride.

A particularly useful heel is the mother liquor (e.g. the centrifuge effluent or filtrate) of a previously conducted reaction wherein tricalcium diisocyanurate is chlorinated in accordance with the process of this invention.

As further illustrative of the process of this invention is the following:

EXAMPLE II

An aqueous slurry of tri-calcium diisocyanurate is prepared as follows:

To a suitable mixing vessel is charged 129 grams (substantially 1 mol) of isocyanuric acid and 580 grams of water. Thereto and with mixing and while maintaining the temperature in the range of 10–15° C. is added a mixture of 111 grams (substantially 1.5 mols) of calcium hydroxide and 259 grams of water. The resulting aqueous slurry contained 186 grams of tricalcium diisocyanurate and 893 grams of water.

To a suitable reaction vessel equipped with an agitator, thermometer and pH electrodes, is charged 300 grams of water containing 33 grams of calcium chloride dissolved therein. While stirring this heel the above-described aqueous slurry of tri-calcium diisocyanurate is added at the rate of 40 cc. per minute. Simultaneously with the addition of the said slurry chlorine gas is bubbled beneath the surface of the aqueous medium at such a rate as to maintain the pH in the range of 4.5 to 5.0. Throughout the addition period the temperature of the reaction mass is maintained at 25° C. Upon completion of the aqueous slurry addition the flow of chlorine is stopped. While slowly agitating the aqueous reaction mass is cooled to 10° C. and thereafter centrifuged. The centrifuge cake, which is the white crystalline hexahydrate of calcium di(dichloroisocyanurate) in admixture with a small amount of free water (actually 6 percent by weight of the centrifuge cake) is then dried at 106° C. in an air-circulating oven for two hours. The dried product (152 grams) is white crystalline anhydrous calcium di(dichloroisocyanurate) of approximately 98% purity which is characterized by an available chlorine content of 63.2%. The centrifuge effluent contained substantially all of the calcium chloride produced in the reaction system and that which was added in the aqueous heel as well as 61 grams of calcium di(dichloroisocyanurate). This centrifuge effluent upon vacuum concentrating at 50° C. to remove substantially 50 percent of the water, cooling the residue to 5° C., centrifuging the precipitated solids, and drying the centrifuge cake at 105° C. gave an additional 38 grams of anhydrous calcium di(dichloroisocyanurate).

EXAMPLE III

An aqueous slurry of tri-calcium diisocyanurate is prepared as follows:

To a suitable mixing vessel is charged 129 grams (substantially 1 mol) of isocyanuric acid and 580 grams of water. Thereto and with mixing and while maintaining the temperature in the range of 10–15° C. is added a mixture of 111 grams (substantially 1.5 mols) of calcium hydroxide and 259 grams of water. The resulting aqueous slurry contained 186 grams of tricalcium diisocyanurate and 893 grams of water.

To a suitable reaction vessel equipped with an agitator, thermometer and pH electrodes, is charged 300 grams of water containing 33 grams of calcium chloride dissolved therein. While stirring this heel the above-described aqueous slurry of tri-calcium diisocyanurate is added at the rate of 40 cc. per minute. Simultaneously with the addition of the said slurry chlorine gas is bubbled beneath the surface of the aqueous medium at such a rate as to maintain the pH in the range of 4.5 to 5.0. Through the addition period the temperature of the reaction mass is maintained at 40 to 45° C. Upon completion of the aqueous slurry addition the flow of chlorine is stopped. The aqueous reaction mass is slowly agitated for about 30 minutes at about 45° C. and thereafter centrifuged. The centrifuge cake, which is the white crystalline tetrahydrate of calcium di(dichloroisocyanurate) in admixture with a small amount of free water is then dried at 106° C. in an air-circulating oven for two hours. The dried product (105 grams) is white crystalline anhydrous calcium di(dichloroisocyanurate) of approximately 98% purity which is characterized by an available chlorine content of 63.2%. The centrifuge effluent contained substantially all of the calcium chloride produced in the reaction system and that which was added in the aqueous heel as well as 106 grams of calcium di(dichloroisocyanurate). This centrifuge effluent upon vacuum concentrating at 50° C. to remove substantially 50 percent of the water, cooling the residue to 5° C., centrifuging the precipitated solids, and drying the centrifuge cake at 105° C. gave an additional 67 grams of anhydrous calcium di(dichloroisocyanurate).

X-ray diffraction analysis of the tetrahydrate of calcium di(dichloroisocyanurate) revealed the following principal lines (relative intensities greater than 10%).

*Table III*

| Interplanar spacing: | Relative intensity |
|---|---|
| 8.3387 | 100 |
| 3.9482 | 47 |
| 3.1728 | 38 |
| 2.0696 | 33 |
| 3.0354 | 31 |
| 2.4793 | 30 |
| 3.2639 | 26 |
| 3.3115 | 25 |
| 2.7608 | 23 |
| 2.4338 | 20 |
| 2.8208 | 17 |
| 4.7160 | 16 |
| 4.6913 | 14 |
| 2.1493 | 12 |

The hydrates of calcium di(dichloroisocyanurate) as aforementioned are useful for oxidizing, bleaching, sterilizing and disinfecting purposes. For example an aqueous oxidizing, bleaching, sterilizing and disinfecting liquid composition is prepared by dissolving the hexahydrate or tetrahydrate of calcium di(dichloroisocyanurate) in water or in an aqueous solution of an alkaline alkali metal detergent builder salt such as sodium tripolyphosphate. The anhydrous form of calcium di(dichloroisocyanurate) is preferably used to prepare solid oxidizing, bleaching, sterilizing and disinfecting compositions. As illustrative of the stability of anhydrous calcium di(dichloroisocyanurate) as compared to anhydrous sodium dichloroisocyanurate 2 grams of each in anhydrous powdered (−140, +200 mesh) crystalline form is mechanically mixed with 75 grams of silica, 14.5 grams of trisodium phosphate dodecahydrate, 7.5 grams of anhydrous sodium tripolyphosphate and 3 grams of sodium dodecyl benzene sulfonate. The respective compositions are then placed in open wide-mouthed bottles and put in a humidity cabinet and exposed to a temperature of 32° C. at 85% relative humidity for 60 days. Upon removal of the respective mixtures the percentage weight loss of available chlorine is found to be as follows:

| | Percent |
|---|---|
| Sodium dichloroisocyanurate | 72 |
| Calcium di(dichloroisocyanurate) | 32 |

While this invention has been described with respect to certain embodiments it is to be understood that it is not so limited and it is to be further understood that variations and modifications thereof obvious to those skilled in the art can be employed without departing from the spirit or scope of this invention.

What is claimed is:

1. The method of making calcium di(dichloroisocyanurate) and hydrates thereof which comprises the steps of bringing together and reacting, at a pH in the range of from about 4.5 to 7.5, chlorine and an aqueous slurry containing from 5 to 45 parts by weight of tricalcium diisocyanurate per 100 parts by weight of water in a reaction zone, thereby forming an aqueous reaction slurry in said zone having a pH in said range, maintaining the temperature of said reaction slurry in the range of from about 10° C. to about 65° C. and thereafter separating hydrated calcium di(dichloroisocyanurate) from the bulk of the aqueous phase associated therewith in the aqueous reaction slurry.

2. The method of claim 1 wherein substantially four molecular proportions of chlorine are consumed for each molecular proportion of tricalcium diisocyanurate.

3. A continuous process for preparing calcium di(dichloroisocyanurate) and hydrates thereof which comprises continuously mixing at a pH in the range of from about 4.5 to about 7.5, chlorine and an aqueous slurry containing from about 5 to 45 parts by weight of tricalcium diisocyanurate per 100 parts by weight of water in a reaction zone, the rate of addition and of mixing said chlorine and said slurry of tricalcium diisocyanurate in said zone being such as to continuously provide and maintain an aqueous reaction slurry in said zone having a pH in said range, continuously maintaining the temperature of said reaction slurry in the range of about 10° C. to 65° C. thereby continuously forming hydrated calcium di(dichloroisocyanurate) in said reaction slurry; continuously removing a portion of said reaction slurry containing hydrated calcium di(dichloroisocyanurate) from the reaction zone and separating hydrated calcium di(dichloroisocyanurate) from the bulk of the aqueous phase of the reaction slurry so removed.

4. The process of claim 3 wherein the temperature in the reaction zone is maintained in the range of from above about 37° C. to about 65° C. and calcium di(dichloroisocyanurate) tetrahydrate is formed in and separated from the bulk of the aqueous phase of the reaction slurry.

5. The process of claim 3 wherein the temperature in the reaction zone is maintained in the range of from about 10° C. to below about 35° C. and calcium di(dichloroisocyanurate) hexahydrate is formed in and separated from the bulk of the aqueous phase of the reaction slurry.

6. A continuous process of preparing calcium di(dichloroisocyanurate) which comprises continuously mixing, at a pH in the range of from about 5.0 to 7.0, chlorine and an aqueous slurry containing from about 5 to 45 parts by weight of tricalcium diisocyanurate per 100 parts by weight of water in a reaction zone, the rate of addition and of mixing said chlorine and said slurry of tricalcium diisocyanurate in said zone being such as to continuously provide and maintain an aqueous reaction slurry in said zone having a pH in said range; continuously maintaining the temperature of said reaction slurry in the range of about 20° C. to 40° C. thereby continuously forming hydrated calcium di(dichloroisocyanurate) in said reaction slurry; continuously removing a portion of said reaction slurry containing hydrated calcium di(dichloroisocyanurate) from said reaction zone, separating hydrated calcium di(dichloroisocyanurate) from the bulk of the aqueous phase of the reaction slurry so removed and thereafter drying the hydrated calcium di(dichloroisocyanurate).

References Cited in the file of this patent
UNITED STATES PATENTS

| | | |
|---|---|---|
| 2,184,886 | Muskat et al. | Dec. 26, 1939 |
| 2,913,460 | Brown et al. | Nov. 17, 1959 |
| 2,964,525 | Robinson | Dec. 13, 1960 |
| 2,969,360 | Westfall | Jan. 24, 1961 |

FOREIGN PATENTS

| | | |
|---|---|---|
| 219,930 | Australia | Jan. 2, 1959 |
| 565,256 | Canada | Oct. 28, 1958 |
| 1,149,758 | France | July 22, 1957 |

OTHER REFERENCES

Hantzsch: Journal of the Chemical Society, vol. 90 (I), pages 146 to 148 (1906).

Hands et al.: Journ. of the Society of Chemical Industry, vol. 67, pages 66 to 69 (1948).